E. H. MARSH.
Chinch-Bug Gatherer.

No. 160,606.  Patented March 9, 1875.

WITNESSES
Robert Everett
Geo. E. Uphaue

INVENTOR
Ephraim H. Marsh,
Chipman Hosmer & Co
ATTORNEYS

UNITED STATES PATENT OFFICE.

EPHRAIM H. MARSH, OF OSAGE MISSION, KANSAS.

IMPROVEMENT IN CHINCH-BUG GATHERERS.

Specification forming part of Letters Patent No. 160,606, dated March 9, 1875; application filed January 23, 1875.

*To all whom it may concern:*

Be it known that I, EPHRAIM H. MARSH, of Osage Mission, in the county of Neosho and State of Kansas, have invented a new and valuable Improvement in Chinch-Bug Gatherer or Spoon; and I do hereby declare that the following is a full, clear, and exact description of the construction and operation of the same, reference being had to the annexed drawings, making a part of this specification, and to the letters and figures of reference marked thereon.

Figure 1:
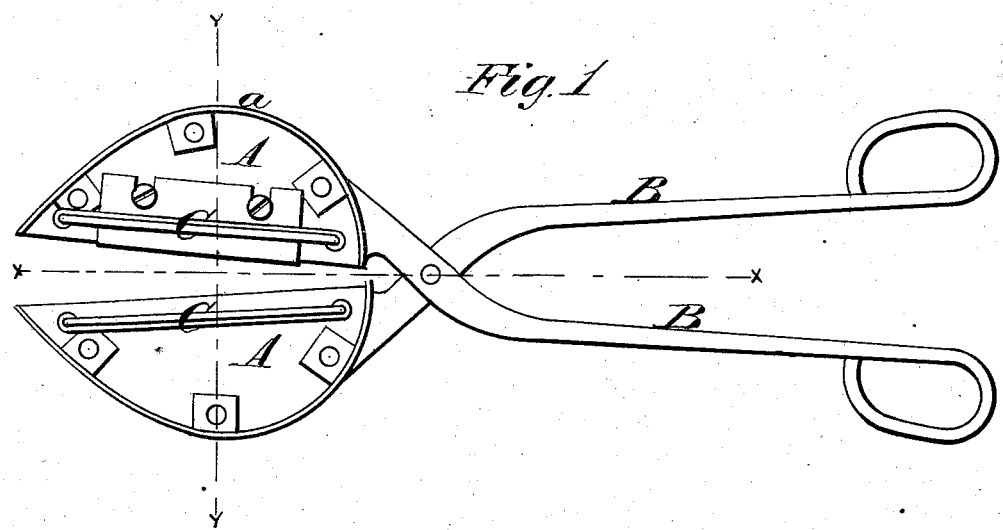
Figure 2:
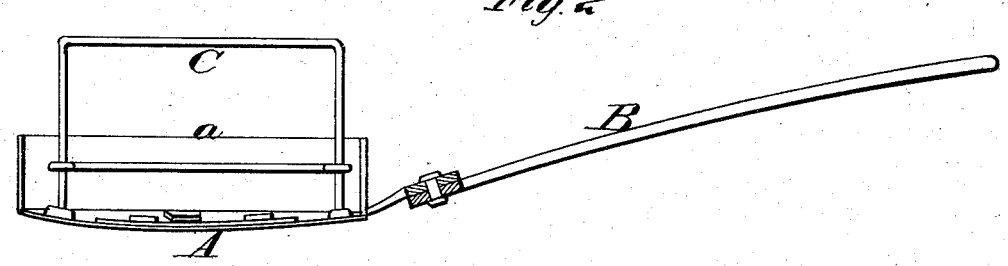
Figure 3:
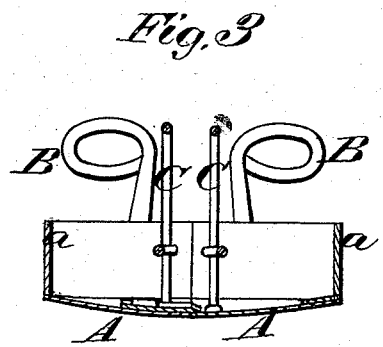

Figure 1 of the drawing is a representation of a plan view of my device. Fig. 2 is a longitudinal vertical sectional view of the same; and Fig. 3 is a transverse vertical sectional view.

This invention has relation to shears which are designed for cutting young corn for the purpose of exterminating bugs which destroy the corn and wheat.

My invention consists in the combination of wire-frames with box-shears, as will be hereinafter explained, whereby the clipped corn will be held in an upright position, and the bugs retained thereon until destroyed.

In the annexed drawings, A A designate two cutting-blades, each one of which is of a semi-elliptic form, and constructed with a flange, *a*, on its curved edge. The straight edge of each blade may be formed of a removable strip of steel, although I do not confine myself thereto. The handles B B are crossed and pivoted together like a pair of shears, and the bottoms of the blades are convex, for the purpose of cutting close down to the ground. C C are two rectangular frames, which are rigidly secured to the upper sides of the blades A A, in lines parallel to the cutting-edges thereof, and in close relation thereto. When a stalk of corn, having a bug on it, is cut with the shears, the frames hold it upright, and the flanges *a a* prevent it escaping, should it fall off the severed stalk. The bugs after being caught are destroyed in any convenient manner.

What I claim as new, and desire to secure by Letters Patent, is—

In combination with a pair of box-shears, the frames C C, arranged substantially in the manner and for the purpose set forth.

In testimony that I claim the above I have hereunto subscribed my name in the presence of two witnesses.

EPHRAIM H. MARSH.

Witnesses:
C. H. HOWARD,
S. S. WARNER.